United States Patent
Golovin

(10) Patent No.: US 6,444,609 B1
(45) Date of Patent: Sep. 3, 2002

(54) MANGANESE-BASED OXYGEN REDUCTION CATALYST, METAL-AIR ELECTRODE INCLUDING SAID CATALYST AND METHODS FOR MAKING THE SAME

(75) Inventor: Neal Golovin, Pepper Pike, OH (US)

(73) Assignee: AER Energy Resources, Inc., Smyrna, GA (US)

( * ) Notice: Subject to any disclaimer, the term of this patent is extended or adjusted under 35 U.S.C. 154(b) by 197 days.

(21) Appl. No.: 09/639,475

(22) Filed: Aug. 15, 2000

(51) Int. Cl.[7] .............................. B01J 23/32; H01M 4/50
(52) U.S. Cl. ........................................ 502/324; 429/224
(58) Field of Search ..................... 502/324; 423/605; 429/224, 27, 40

(56) References Cited

U.S. PATENT DOCUMENTS

| | | | |
|---|---|---|---|
| 4,269,691 A | | 5/1981 | Deborski |
| 4,333,993 A | | 6/1982 | Gibbard |
| 4,350,745 A | * | 9/1982 | Parsen et al. ................. 429/57 |
| 4,405,699 A | | 9/1983 | Kruger |
| 4,500,566 A | | 2/1985 | Karas et al. |
| 4,581,219 A | * | 4/1986 | Imada et al. ................. 423/605 |
| 4,595,643 A | | 6/1986 | Koshiba et al. |
| 4,853,207 A | * | 8/1989 | Wautier et al. .............. 423/592 |
| 4,892,637 A | * | 1/1990 | Sauer et al. ................. 204/291 |
| 5,079,106 A | * | 1/1992 | Urry ............................. 429/27 |
| 5,214,014 A | * | 5/1993 | Yoshimoto et al. ........... 502/84 |
| 5,271,797 A | * | 12/1993 | Kamisawa ................... 156/635 |
| 5,674,644 A | * | 10/1997 | Nazri .......................... 429/224 |
| 5,840,615 A | | 11/1998 | Aoki et al. |
| 5,866,278 A | * | 2/1999 | Sumida et al. .............. 429/224 |
| 5,914,094 A | | 6/1999 | Sun et al. |
| 5,997,829 A | * | 12/1999 | Sekine et al. ............... 423/210 |
| 6,071,486 A | * | 6/2000 | Koehlert et al. ............ 423/335 |
| 6,129,898 A | * | 10/2000 | Watkins et al. ........... 423/239.1 |

OTHER PUBLICATIONS

Wolfram Holand and Volker Rheinberger, "*Inorganic–Organic Sol–Gel Processing*," Glass Science and Technology, Proceedings of the Norbert Kreidl Symposium on the Present State and Future Prospects of Glass Science and Technology, Jul. 3–8, 1994, pp. 214–223, Frankfurt, Germany.

* cited by examiner

Primary Examiner—Steven Bos
Assistant Examiner—Cam N. Nguyen
(74) Attorney, Agent, or Firm—Alston & Bird LLP

(57) ABSTRACT

A manganese based catalyst for use in a metal-air electrochemical cell wherein the catalyst is made by a sol-gel process. The sol-gel process creates catalyst particles that are submicron and easily distributed throughout the active layer of the electrode.

7 Claims, 1 Drawing Sheet

MANGANESE-BASED OXYGEN REDUCTION CATALYST, METAL-AIR ELECTRODE INCLUDING SAID CATALYST AND METHODS FOR MAKING THE SAME

FIELD OF INVENTION

The present invention relates to a manganese based catalyst for use in a metal-air electrochemical cell, and more particularly, relates to the composition and manufacture of an air electrode comprising said catalyst.

BACKGROUND OF THE INVENTION

Metal-air electrochemical cells utilize oxygen from the ambient air as a reactant in an electrochemical reaction to provide a relatively lightweight power supply. Generally described, a metal-air cell includes an air-permeable cathode and a metallic anode separated by an aqueous electrolyte. During the operation of a metal-air cell, oxygen from the ambient air is reduced at the cathode to form hydroxide ions. The metal is oxidized at the anode and reacts with the hydroxide ions, such that electrons are released to provide electrical energy.

Most air electrodes are either inherently or by purposive implementation, catalytically active. Although effective air electrodes are available, there remains a need for air electrodes with enhanced catalytic activity. An important factor in optimizing electrode performance is catalyst particle dispersion. The more uniformly the catalyst is dispersed and the smaller the size of the catalyst particles, the higher the activity of the air electrode. With conventional methods of catalyst production it is difficult to reduce the particle size of the catalyst enough to uniformly distribute it throughout the active layer of the electrode. The method of the present invention produces an oxygen reduction catalyst wherein the catalyst particles are small enough to be uniformly distributed within the electrode.

SUMMARY OF INVENTION

The present invention fulfills the above-described need by providing a method of producing a manganese based oxygen reduction catalyst for use in an air electrode using a sol-gel process. This invention also encompasses the resulting catalyst, a cathode comprising said catalyst and methods of making a cathode comprising said catalyst. Surprisingly, the sol-gel method produces a catalyst having particles sizes which are submicron and easily dispersed throughout a catalyst support.

More particularly, the present invention relates to a method of producing a manganese based oxygen reduction catalyst wherein a solution of a manganese alkoxide and an alcohol is prepared. Water is added to the solution to form a sol and then the sol is heated to a temperature sufficient to remove the alcohol and form a gel. The gel is mixed with activated carbon and heated at a temperature between 150° C. to 250° C. to form a manganese oxide.

The present invention also relates to an air cathode comprising the above-described catalyst. More particularly, the air cathode comprises an active layer including the oxygen reduction catalyst of the present invention. In addition, the air cathode includes a current collector in electrical contact with the electrode. The active layer of the air cathode further comprises carbon black and a non-wetting agent/binder such as polytetrafluoroethylene.

More particularly, the active layer is formed by admixing the manganese based catalyst with an adsorptive particulate material, such as carbon black, and a non-wetting agent/binder, such as polytetrafluoroethylene.

Other objects, features, and advantages of this invention will become apparent to those skilled in the art upon understanding the foregoing detailed description and accompanying drawings.

DETAILED DESCRIPTION OF THE PREFERRED EMBODIMENT

Figure 1:
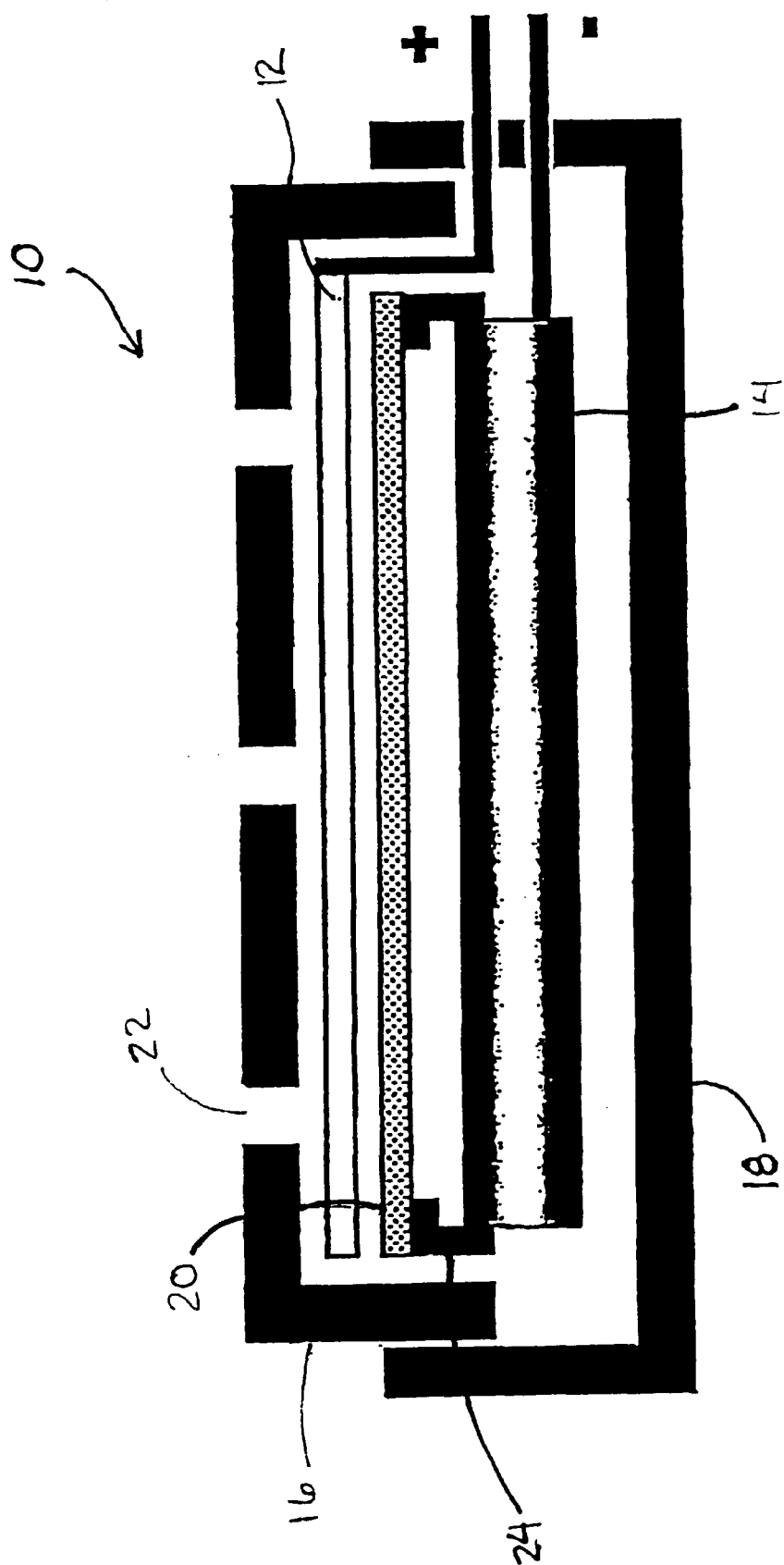
FIG. 1 is a partial, cross-sectional, elevation view of a metal-air cell made in accordance with an embodiment of the present invention.

As summarized above, this invention encompasses a method of producing a manganese based catalyst for use in a metal-air electrochemical cell, the resulting catalyst, an air cathode comprising said catalyst, and a method for making the air cathode. Embodiments of this invention are described in detail below.

The catalyst of the present invention is produced by a sol-gel method wherein a solution of a manganese alkoxide and an alcohol is prepared. Suitable manganese alkoxides include methoxide, ethoxide, and iso-propoxide. Manganese (II) iso-propoxide is preferred. Suitable alcohols include, but are not limited to methanol, ethanol, 2-propanol, and iso-propanol. Water is then added to the manganese alkoxide/alcohol solution to cause a sol to form. The sol is a highly ordered colloidal suspension having extremely small dispersions of manganese throughout. The sol is then heated to a temperature sufficient to remove the alcohol, thereby producing a gel. This temperature typically ranges from about 85° C. to about 95° C. The gel is then mixed with activated carbon and pyrolysis is carried out in an air atmosphere at drying temperatures between 150° C. to 250° C.

As shown in FIG. 1, a metal-air cell 10 made according to this invention is desirably arranged so that the air cathode 12 is positioned adjacent a gelled anode 14 in a cell case comprising an upper case 16 and a lower case 18. A separator material 20 is located between the air cathode 12 and the gelled anode 14. A frame 24 located within the cell case is positioned to partially surround the separator 20 and the air cathode 12. The air cathode 12 is disposed adjacent an opening 22 in the upper cell case 16 so that the air cathode can be exposed to air. Preferably, the metal air cell 10 is prismatic in shape.

The air cathode 12 of the present invention comprises an active layer formed on a current collector. The active layer has an air side which faces outwardly from the upper cell case 16 and an electrolyte side which faces toward the gelled anode 14. Generally described, the active layer comprises the oxygen reduction catalyst of the present invention, an oxygen adsorptive particulate material, such as carbon black, and a binder/non-wetting agent. Preferably, the oxygen reduction catalyst is distributed throughout the active layer of the air cathode 12.

The active layer of the air cathode 12 may comprise one or more oxygen reduction catalysts in addition to the catalyst of the present invention. Additional oxygen reduction catalysts include, but are not limited to manganese, silver, cobalt oxides or spinels having the formula $Co_xO_y$, transition metal macrocyclics such as cobalt tetramethoxyphenylporphyrin (CoTMPP), and pervoskites such as lanthanum/nickel/cobalt oxide ($LaNi_{1-x}CO_xO_y$) or lanthanum/iron/cobalt oxide ($LaFe_{1-x}CO_xO_y$), and mixtures thereof. Manganese oxide is preferred.

The oxygen reduction catalysts are present in an amount effective to produce a satisfactory level of current on the first and subsequent discharge cycles of the metal-air cell 10 in which the air cathode 12 is used.

The oxygen adsorptive particles in the active layer of the air cathode 12 are preferably activated carbons. Desirably, the activated carbon is a mixture of activated carbon comprising relatively high surface area carbon black and lower surface area carbon black. A suitable high surface area activated carbon has a surface area from about 200 to about 2000 $m^2/g$ and a suitable low surface area carbon black has a surface area from about 50 to about 200 $m^2/g$. Suitable binder/non-wetting agents include polytetrafluoroethylene (Teflon).

The relative amounts of the components of the air cathode active layer may vary. Preferably, however, the oxygen reduction catalyst is present in the active layer in a total amount from about 3 to about 10 percent by weight of the active layer, the activated carbon is present in an amount from about 70 to about 85 percent by weight of the active layer, and the polytetrafluoroethylene is present in the active layer in a total amount from about 5 to about 25 percent by weight of the active layer. According to one embodiment, the oxygen reduction catalyst is present in an amount of 5% by weight of the active layer, the activated carbon is present in an amount of 75% by weight of the active layer, and the non-wetting agent/binder is present in an amount of 20% by weight of the active layer.

The air cathode 12 also includes a current collector in electrical contact with the cathode. The current collector is preferably a nickel plated screen or nickel expanded metal and preferably is a double cold bonded nickel screen. Suitable current collectors are effective conductors of electric current but are inert to the electrolyte and other components of the metal-air cell 10 in which the air cathode 12 is used. Generally, suitable current collectors include fine mesh metal screens and expanded, perforated metal sheets made of non-corrosive metal such as nickel, tin, or titanium.

The air anode 14 also includes a current collector made of a metal which is capable of conducting electricity produced during discharge of a cell but not being oxidized during discharge of the cell. Typical metals for the current collector include brass, copper, nickel, tin, titanium, or a metallic substrate coated with these materials. The anode current collector is desirably a wire mesh or an expanded metal screen. The anode 14 also includes a brass screen current collector.

The separator 20 disposed between the air cathode 12 and the gelled anode 14 separates the cathode and anode so that the electrodes do not come in direct electrical contact with one another and short circuit the cell 10. The separator 20 is adhered to the electrolyte side of the cathode 12. More particularly, the separator 20 is oxidation-resistant under conditions of operation of the metal-air cell and is permeable to electrolyte, but substantially impermeable to the metallic ions and compounds produced at the anode 14. A suitable material for the separator 20 is 3501CELGARD™ wettable microporous polypropylene from Hoechst Celanese Corporation of Charlotte, N.C.

The air side of the cathode 12 is covered with a water impermeable film such as a polytetrafluoroethylene film. This film is adhered to the air side of the air cathode 12 and inhibits the transfer of electrolyte in and out of the cell through the air cathode 12.

The air cathode 12 of the present invention is made according to a process comprising forming an active layer made with the oxygen reduction catalyst of the present invention, and positioning the current collector in electrical contact with the active layer. The active layer is formed by admixing the oxygen reduction catalyst with an adsorptive particulate material, such as activated carbon, and a non-wetting agent/binder, such as polytetrafluoroethylene.

The air cathode 12 can be made by conventional methods known to those skilled in the art such as filtration using methanol or water or both as a solvent and the wet paste method using methanol or water as a solvent. U.S. Pat. No. 4,129,489 to Chottiner, titled "Multi-Ply Laminar Pasted Air Electrodes", the entire disclosure of which is incorporated herein by reference, discloses a suitable wet paste method. Desirably, however, the air cathode 12 is made by a dry press method described hereinbelow.

Another suitable cathode 12 includes a hydrophobic layer, an active layer, and a current collector. The hydrophobic layer comprises a low surface area, conductive carbon black, such as Shawinigan acetylene black, and a particulate PTFE binder. The active layer comprises an activated carbon treated with the oxygen reduction catalyst of the present invention so as to produce a mixture of $Mn^{+3}$ and $Mn^{+4}$ on the carbon surface, a high surface area conductive carbon black, and PTFE (polytetrafluoroethylene) binder. A suitable activated carbon is Calgon Carbon PWA grade activated carbon (available from Calgon Carbon Corporation of Pittsburgh, Pa.) having an iodine surface area of 1100 and the preferred conductive carbon black is Ketjen EC-600 (available from Akzo-Nobel of Chicago, Ill.) or Cabot black Pearls 2000 (available from Cabot Corporation of Boston, Mass.) having a BET surface area of 1100–1200 $m^2/g$. The ratio of activated carbon to carbon black in the active layer is suitably 60% activated carbon to 40% carbon black. The PTFE binder is present in the active layer in an amount of about 10% by total weight of the active layer.

The hydrophobic layer is made by a dry powder process in a continuous manner. The hydrophobic layer is made by mixing the low surface area, conductive, carbon black and the PTFE bonder and dry pressing this material onto a metal grid current collector.

The active layer is made by a liquid suspension of the active layer ingredients and applying the suspension directly to the hydrophobic layer after the hydrophobic layer is formed. The resulting active layer has a thickness of about 3–5 mils (75–250 microns). The final active layer composition is deposited on the hydrophobic layer by techniques such as Mayer rod, roll coating, filter bed deposition, spray coating, and the like.

To form the active layer, the activated carbon is catalyzed with the oxygen reduction catalyst of the present invention. The activated carbon is mixed with the oxygen reduction catalyst of the present invention to form a suspension. Hydrogen peroxide is added to the suspension and the carbon is then filtered and dried at 100° C. for four hours.

Next, the catalyzed carbon black is chopped and mixed with the high surface area conductive carbon black. An aqueous suspension of PTFE is added to the mixture of catalyzed activated carbon and carbon black to form a paste. This paste is dried for twenty hours at 100° C. and then chopped. This material is then deposited on the hydrophobic layer to form the active layer and complete the cathode. Particular embodiments of the two types of cathodes described above are illustrated in the following Examples 1 and 2, respectively.

EXAMPLE 1

A solution comprising 42.06 ml manganese (II) isopropoxide solution and 100 ml (isopropanol) is prepared. 100 ml water is added to the solution to produce a sol. The sol is then heated at a temperature of 90° C. to remove the alcohol and produce a gel. The gel is mixed with 20.4 grams of activated carbon and pyrolysis is carried out in an air atmosphere at a drying temperature of 175° C.

The catalyst material is then mixed with a high surface area carbon black to form a cathode material. The carbon black is a mixture of 30% by weight Ketjen EC-600JD carbon black having a surface area of 1200 $m^2/g$ and 70% by weight Shawinigan carbon black from Chevron having a surface area of 70–90 $m^2/g$. The air side of the cathode is covered with polytetrafluoroethylene film and the separator between the air cathode and the gelled anode is 3501CEL-GARD™ wettable microporous polyporpylene from Hoecchst Celanese Corporation of Charlotte, N.C.

The cathode is made by the dry press method which comprises pressing a dry active layer against a current collector under high temperatures. The active layer mixture is formed by mixing the carbon blacks with the catalyst material and then adding Teflon 30B to the mixture. The oxygen reduction catalyst is present in an amount of 5% by weight of the active layer, carbon black is present in an amount of 75% by weight of the active layer, and polytetrafluoroethylene (Teflon) is present in an amount of 20% by weight of the active layer. The resulting active layer mixture is dried for over 20 hours in a convection oven at 100° C. The dried active layer mixture is then chopped to a particle size of about 180 microns in a blender.

The current collector is rinsed with MeOH and then the dried active layer mixture is spread on the current collector. The active layer and current collector are wrapped in stainless steel foil and placed between the plates of a hot hydraulic press. The current collector and active layer are then pressed for 15 minutes at 617° F. and 3,300 psig.

EXAMPLE 2

A solution comprising 42.06 ml manganese (II) isopropoxide solution and 100 ml (isopropanol) is prepared. 100 ml water is added to the solution to produce a sol. The sol is then heated at a temperature of 90° C. to remove the alcohol and produce a gel. The gel is mixed with 20.4 grams of activated carbon to form a suspension. The suspension is stirred for 10 minutes and then 10 milliliters of 30% hydrogen peroxide is added to the suspension fairly slowly, drop by drop under a hood. The resulting suspension is stirred for an additional 15 minutes.

After stirring, the carbon suspension is filtered under vacuum through a Buchner funnel. The filtrate is colorless and the residue is allowed to dry in air for 15 minutes. The resulting carbon cake is dried at atmospheric pressure, under air, at 100° C. for 4 hours and the yield is roughly 20 grams of catalyzed carbon.

The hydrophobic layer of the cathode is made by blending a mixture of Shawinigan acetylene carbon black and PTFE binder and dry pressing the mixture onto a metal grid current collector. The hydrophobic layer comprises 65% by weight acetylene black and 35% by weight Teflon binder.

The active layer of the cathode is made by chopping the catalyzed activated carbon in a coffee grounder for 5 minutes. 10.2 grams of the chopped catalyzed activated carbon and 6.8 grams of Ketjen carbon black are mixed for 10 minutes in a kitchen-type blender at a crumb setting. 6 grams of Teflon 30B at a pH of 10 and 25 milliliters of distilled water are added to the catalyzed activated carbon and carbon black mixture and mixed for 40 seconds to form a suspension. This suspension is dried for 20 hours at 100° C. in a convection oven. The dried material is then chopped in a kitchen-type blender at crumb setting to a particle size of about 100 microns. This active layer is then deposited on the previously formed hydrophobic layer in a liquid suspension as described above.

It is to be understood that these examples are illustrative embodiments and that this invention is not to be limited by any of the examples or details in the description. Those skilled in the art will recognize that the present invention is capable of many modifications and variations without departing from the scope of the invention. Accordingly, the detailed description and examples are meant to be illustrative and are not meant to limit in any manner the scope of the invention as set forth in the following claims. Rather, the claims appended hereto are to be construed broadly within the scope and spirit of the invention.

We claim:

1. A method of making a catalyst for use in an electrochemical cell, the method comprising:

preparing a solution of a manganese alkoxide and alcohol;

adding water to the solution to form a sol;

heating the sol to a temperature sufficient to remove the alcohol and form a gel;

mixing the gel with activated carbon; and heating the mixture of the gel and the activated carbon to a temperature sufficient to evaporate the water and form a manganese oxide catalyst.

2. The method of claim 1, wherein the manganese alkoxide is manganese (II) iso-propoxide.

3. The method of claim 1, wherein the alcohol is selected from the group consisting of methanol, ethanol, 2-propanol, and iso-propanol.

4. The method of claim 1, wherein the sol is heated to a temperature between about 85° C. to about 95° C.

5. The method of claim 1, wherein the manganese oxide produced is in the form of submicron particles.

6. The method of claim 1, wherein the activated carbon is PWA carbon.

7. The method of claim 1, wherein the activated carbon is heated to a temperature between about 150° C. to about 250° C.

* * * * *